United States Patent
Ghosh et al.

(10) Patent No.: US 6,774,764 B2
(45) Date of Patent: Aug. 10, 2004

(54) SECURING SYSTEM FOR MOTOR VEHICLE

(75) Inventors: Sharmila Ghosh, Mainz (DE); Gerd Gruchalski, Kreuztal (DE)

(73) Assignee: Delphi Technologies, Inc., Troy, MI (US)

( * ) Notice: Subject to any disclaimer, the term of this patent is extended or adjusted under 35 U.S.C. 154(b) by 416 days.

(21) Appl. No.: 09/791,382

(22) Filed: Feb. 23, 2001

(65) Prior Publication Data

US 2002/0024460 A1 Feb. 28, 2002

(30) Foreign Application Priority Data

Feb. 25, 2000 (DE) .................................. 200 06 831 U
Apr. 3, 2000 (DE) .......................................... 100 16 537

(51) Int. Cl.$^7$ ............................. G05B 19/00; G06F 7/00; G08B 29/00; H04B 1/00; H04Q 9/00
(52) U.S. Cl. ...................................... 340/5.61; 340/5.8
(58) Field of Search ................................. 340/426, 430, 340/450, 5.61, 10.51, 10.33, 5.8, 825.69, 825.72; 342/42–45, 60, 36; 343/713, 724; 307/10.5

(56) References Cited

U.S. PATENT DOCUMENTS

| | | | | |
|---|---|---|---|---|
| 3,945,006 A | * | 3/1976 | Cleeton ........................ | 342/45 |
| 4,003,049 A | * | 1/1977 | Sterzer et al. ................. | 342/43 |
| 4,292,637 A | * | 9/1981 | Johnson ........................ | 342/44 |
| 4,454,512 A | | 6/1984 | Millett | |
| 4,805,427 A | | 2/1989 | Bates et al. ................... | 70/264 |
| 4,990,906 A | | 2/1991 | Kell et al. .............. | 340/825.31 |
| 5,072,222 A | * | 12/1991 | Fockens ....................... | 342/44 |
| 5,144,667 A | | 9/1992 | Pogue, Jr. et al. ............ | 380/45 |
| 5,153,558 A | | 10/1992 | Robinson et al. ........... | 340/428 |
| 5,293,160 A | | 3/1994 | Kurozu et al. | |
| 5,319,351 A | | 6/1994 | Beezley, Jr. ................ | 340/426 |
| 5,343,205 A | * | 8/1994 | Nowogrodzki ............... | 342/45 |
| 5,369,591 A | * | 11/1994 | Broxmeyer .................. | 701/301 |
| 5,506,905 A | | 4/1996 | Markowski et al. .......... | 380/25 |
| 5,525,996 A | * | 6/1996 | Aker et al. .................. | 342/104 |
| 5,532,522 A | | 7/1996 | Dietz et al. ................ | 307/10.5 |
| 5,723,911 A | * | 3/1998 | Glehr ........................ | 340/10.5 |
| 5,783,989 A | | 7/1998 | Issa et al. | |
| 5,870,020 A | | 2/1999 | Harrison, Jr. ............... | 340/426 |
| 6,011,460 A | * | 1/2000 | Flick ..................... | 340/426.25 |
| 6,084,530 A | * | 7/2000 | Pidwerbetsky et al. .. | 340/10.32 |
| 6,547,333 B2 | | 4/2003 | Parenteau et al. .......... | 297/397 |

FOREIGN PATENT DOCUMENTS

| | | |
|---|---|---|
| DE | 40 30 607 | 6/1993 |
| DE | 4409167 | 6/1995 |
| DE | 4440855 | 5/1996 |
| DE | 297 05 580 | 7/1997 |
| DE | 196 40 426 | 1/1998 |
| DE | 19832204 | 1/2000 |
| DE | 19839696 | 5/2000 |
| DE | 19846803 | 9/2000 |
| EP | 0 472 528 | 2/1994 |
| EP | 0 673 003 | 9/1995 |

* cited by examiner

Primary Examiner—Brian Zimmerman
Assistant Examiner—Nam V Nguyen
(74) Attorney, Agent, or Firm—Stefan V. Chmielewski

(57) ABSTRACT

A securing system, in particular for motor vehicles, comprises at least one multi-functional sensor, which is simultaneously provided both as a radar unit and as a transmitter/receiver unit for communicating with an external device such as a user identifying transponder. The device may have multiple transmitters and/or receivers spatially situated to determine whether the external device is inside or outside the vehicle and may emit a HF-modulated signal that is frequency shifted and re-emitted by the external device and received by the multi-function sensor, wherein a security function may be performed based on both identifying information in the re-emitted HF-modulated signal and the distance to the transponder determined from the time duration between emission of the HF-modulated signal and reception of the re-emitted HF-modulated signal.

9 Claims, 2 Drawing Sheets

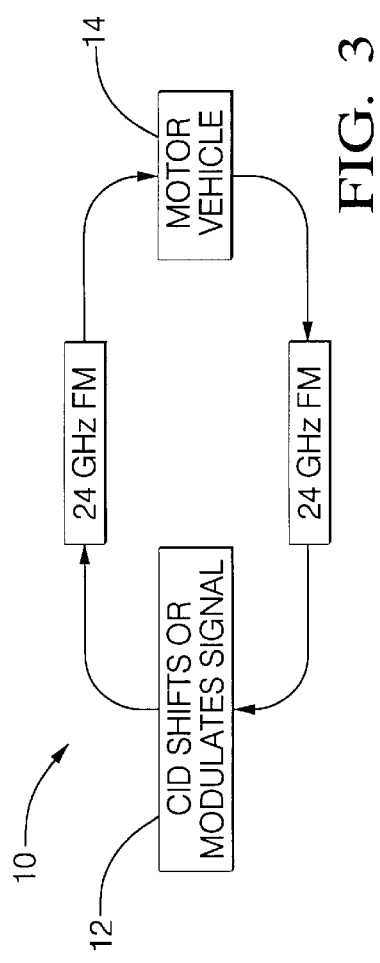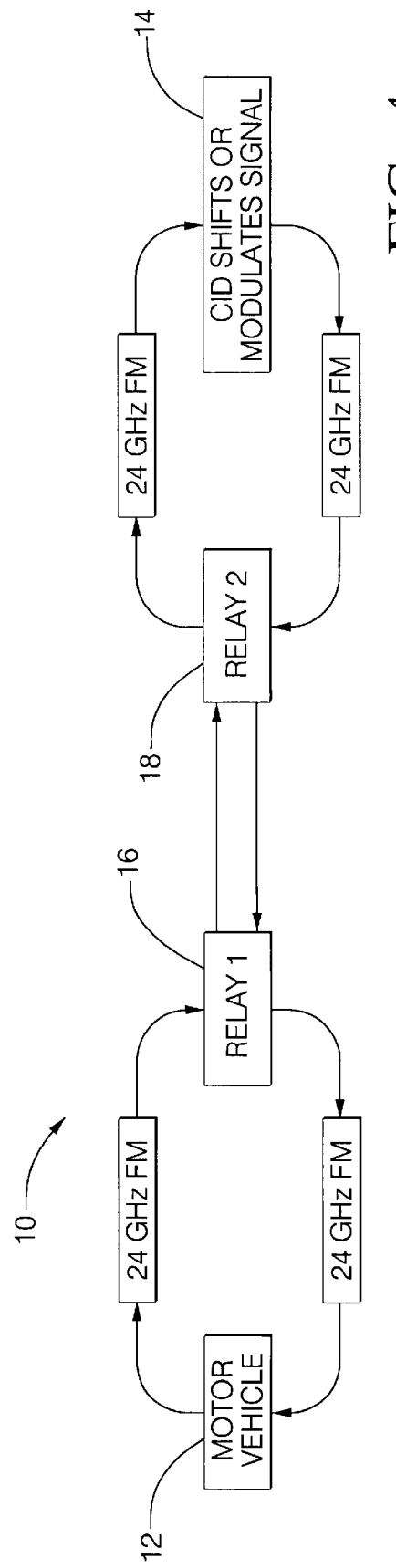

SECURING SYSTEM FOR MOTOR VEHICLE

TECHNICAL FIELD OF THE INVENTION

The invention relates to a securing system in particular for motor vehicles.

BACKGROUND OF THE INVENTION

Chip card systems for a keyless entry are already known in which e.g. the doors and the trunk of the respective motor vehicle can be opened and its engine started by means of a customer identification device (CID), such as for example a chip card, which replaces the key and which serves as user identification. In this, transmission and response signals are exchanged between at least one transmitter which is integrated into the vehicle and the CID. Before a respective function can be carried out the identification code which is transferred from the CID is checked. In this it is sufficient for a user carrying a valid CID on his person to be near the vehicle. A system of this kind for a keyless entry is typically a bidirectional HF communication system, in which for example a frequency of 125 kHz is used for a signal transmission from the motor vehicle to the CID and for example a frequency of 433 MHz is used for a signal transmission from the CID to the motor vehicle.

In these known systems the following two problems mainly arise: (1) It must be distinguished whether the CID is located outside or inside the vehicle. This is currently achieved by the use of a plurality of 125 kHz antennas, which is very cost-intensive and brings about the danger of instabilities in view of the antenna tolerances. (2) The so-called relay station problem, which consists in it being possible for the vehicle to be opened by a thief in that the latter bridges the connection to the CID, which is far remote from the vehicle, via one or more relay stations, can not be avoided with a system operating at 433 MHz or 125 kHz.

In vehicles with keyless entry the inner/outer localization of the CID takes place up to now via a large number of HF coils, which is relatively cost-intensive. The interior space protection and at least parts of the keyless entry have up to now been realized through separate sensors.

The object of the invention is to create a more reliable and more economical securing system in which the above named disadvantages are elininated.

For satisfying this object the securing system in accordance with the invention comprises at least one multi-functional sensor, which is simultaneously provided both as a radar unit and as a transmitter/receiver unit for communicating with an external device.

As a result of this execution it is for example possible to simultaneously fulfill with one and the same sensor device both radar-typical functions, such as for example distance measurements and/or localization functions, and the functions which are typical of the systems for a keyless entry. As a whole there results an extremely simple and correspondingly economical construction. With the simpler construction the reliability is also correspondingly increased.

The multi-functional sensor preferably comprises a short distance radar (SDR) sensor for an interior space protection which operates in the high frequency range. In accordance with the invention a radar sensor of this kind can in particular also be provided simultaneously as a transmitter/receiver unit for communicating with the external device.

In particular in regard to as ideal an area monitoring and/or object localization as possible it is expedient when the multi-functional sensor comprises a plurality of receivers and/or a plurality of transmitters.

In an expedient practical embodiment of the securing system in accordance with the invention the multi-functional sensor comprises at least one transmitter and/or at least one receiver for a wireless communication with the external device.

The external device can in particular be a customer identification device (CID) which serves as user identification and which is preferably realized through an active receiver/transmitter unit or as a transponder.

It is also advantageous when the multi-functional sensor comprises at least two transmitters and/or at least two receivers for localizing the external device. By means of a multi-functional sensor of this kind it can then in particular also be determined whether the external device is located inside or outside the monitored interior space. In this the signals which are received by different receivers and/or are originating from different transmitters are preferably compared with one another for localizing the external device. Via a signal comparison of this kind it can then for example be determined whether the relevant external device is provided inside or outside the monitored interior space.

In an expedient practical embodiment the respective distance between the multi-functional sensor and the external device can be determined through measuring the travel time of the signals which are exchanged between the multi-functional sensor and the external device. It is thereby for example possible to detect a possible unauthorized use by means of a so-called relay station (relay station attack). On the basis of the respective determined distance between the sensor and the external unit, which is for example formed by a CID, the relevant evaluation unit can reliably appraise the respective situation in order to prevent where required the respective functions from being carried out and/or an alarm from being triggered.

A preferred practical embodiment of the securing system in accordance with the invention is distinguished in that the external device picks up signals which are originating from the multi-functional sensor, and which are preferably HF-modulated signals, modifies them in a defined way and then emits them again. The travel time measurement preferably takes place on the basis of such signals which are modified in a defined way by the external device and are picked up again by the multi-functional sensor.

Thus for example a short distance radar (SDR) sensor can at the same time be used for realizing the functions of a system for a keyless entry. Thus for example 24 GHz transceivers of the short distance radar sensor can be used at the same time for communicating with the external device, such as for example a device serving for user identification (CID). With a conception of this kind it is moreover possible to eliminate the two prime priority problems of the previous system for a keyless entry system. Thus an attempted unauthorized use by means of a relay station (relay station attack) can now be detected for example through a corresponding distance measurement and/or through the determination of whether the external device which is formed for example by a CID is located inside or outside the monitored interior space. A single radar sensor unit is sufficient for this.

The invention will be explained in more detail in the following with reference to exemplary embodiments and with reference to the drawings.

DESCRIPTION OF THE PREFERRED EMBODIMENT

The securing system 10 which is illustrated in FIGS. 1 to 4 and which can be used in particular for motor vehicles comprises at least one multi-functional sensor 12, which is simultaneously provided both as a radar unit and as a transmitter/receiver unit for communicating with an external device 14.

In the present exemplary embodiment the multi-functional sensor 12 comprises a short distance radar sensor (SDR), for example a 24 GHz FMCW radar unit. In this the term FMCW radar is to be understood to mean a frequency modulated continuous wave radar.

The SDR unit 12 can for example comprise four receivers (left, right, front, rear) for an automatic interior space protection. The transmitters and receivers of this SDR unit 12 can also be provided for the communication for a keyless entry. Moreover, the SDR unit 12 can also be used for determining the respective distance of the external device. In the present case the SDR unit 12 is simultaneously provided both for the area monitoring and/or object localization and for the communication with the external device 14 for a keyless entry.

The external device 14 can in particular be a customer identification device (CID) serving for user identification, for example a chip card.

With the multi-functional SDR unit 12 there results on the whole a simpler and accordingly more economical and reliable construction of the securing system 10, since now only a single sensor unit is provided for the various functions.

Figure 1:
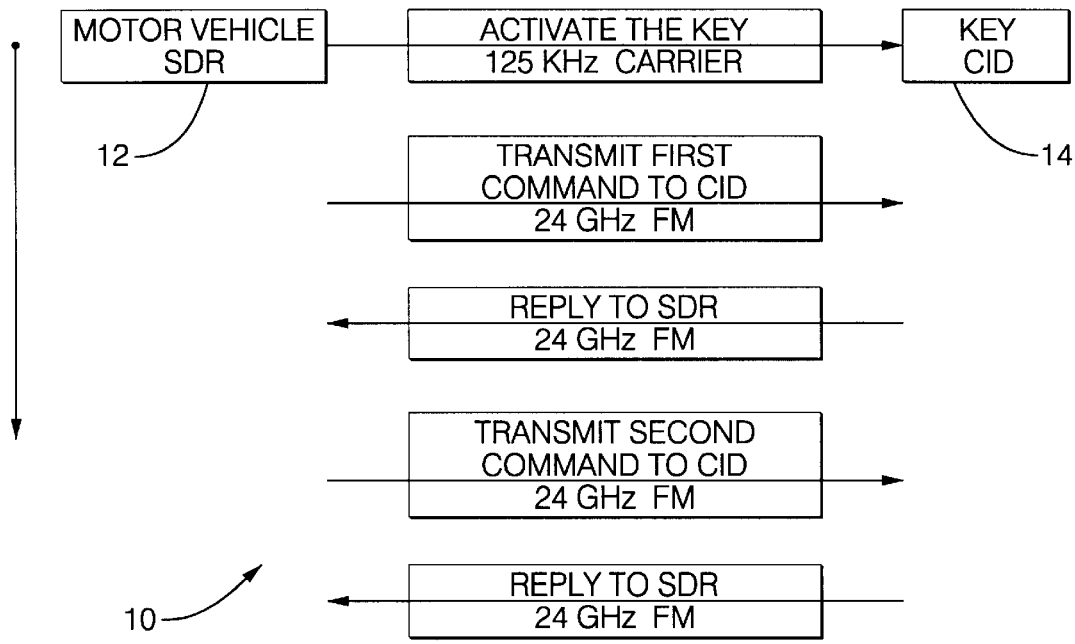
FIG. 1 a function diagram for explaining a normal function of a securing system relevant to the keyless entry in particular for motor vehicles, FIG. 2 a schematic illustration of a short distance radar unit (SDR) of the securing system which is simultaneously used to determine whether a device serving for user identification (CID) is located inside or outside the monitored interior space, FIG. 3 a function diagram for illustrating the normal case in which the user who carries the CID on his person is located in the vicinity of the motor vehicle and a direct communication is taking place between the SDR and the CID, and FIG. 4 a function diagram for illustrating the case of an attempted unauthorized use by means of two relay stations.

FIG. 1 shows a function diagram for explaining a normal function of the securing system which is relevant to the keyless entry.

This normal function which is relevant to the keyless entry can be fulfilled through the transceiver, for example a 24 GHz transceiver, of the SDR unit 12. The entire communication can take place in a semi-duplex operation, which means that transmission and reception can take place at the same frequency, but however at different times.

In this case the motor vehicle or the SDR unit 12 which is associated with the latter respectively operates as a master and the CID 14 which replaces the conventional key as a slave. The SDR unit 12 which is associated with the vehicle emits at a time to a command $t_0$ the CID for example in the form of a 24 GHz FM signal, i.e. of a frequency modulated (FM) signal. The CID 14 receives the FM signal, demodulates this signal and sends back its response for example as a 24 GHz FM signal, e.g. its own identification, in a first step of a request/response sequence. Then the SDR unit 12 which is associated with the motor vehicle transmits the next command, for example an authorization command, etc.

The entire authorization process takes place for example in a frequency range at 24 GHz instead of in a frequency range at 125 kHz and 433 MHz. The SDR unit 12 fulfills to the full extent the required function relevant to the communication.

For example for an emergency function (passive mode) or for activating the CID 14, a 125 kHz mode can e.g. be used in order to reduce the energy requirement for the standby state. This mode is then used exclusively for the just named special functions (emergency function and activation respectively). Then only the master, i.e. the vehicle or the SDR unit 12 which is associated with the latter respectively, transmits a non modulated 125 kHz carrier signal, whereupon a 125 kHz receiver in the CID 14 receives this signal and activates the 24 GHz transceiver. In this no data are transmitted, so that neither a modulation nor a demodulation at 125 kHz is required. Accordingly, the 125 kHz signal acts only as a switch which is used in the first place to save energy or to supply the CID with energy in an emergency function respectively.

Figure 2:
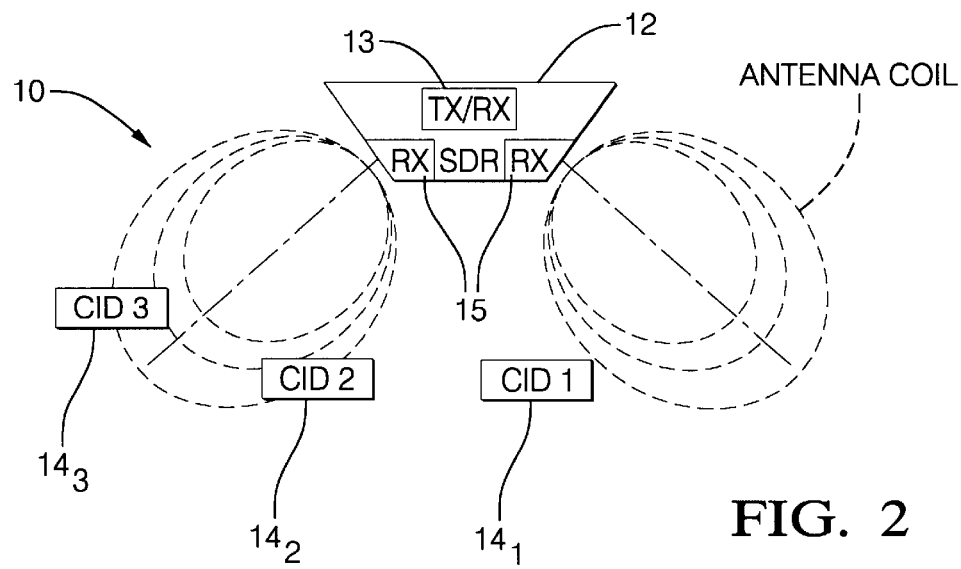

FIG. 2 shows a schematic illustration of a short distance radar unit (SDR) 12 of the securing system 10, which is simultaneously used to determine whether the CID 14 is located inside or outside the monitored interior space.

In a vehicle it must be determined whether the CD 14 is located outside or inside the vehicle interior. The presence of the CD 14 is determined through the transceiver 13 (combination transmitter and receiver), for example a 24 GHz transceiver, of the SDR unit in that the amplitudes of the CD signals which are received by all, for example four, receivers 15 of the SDR unit 12 are compared with one another. The 24 GHz transceiver can be positioned in particular in the middle of the vehicle on the roof.

If the amplitudes of the four signals are at least approximately of equal magnitude, then the CID $14_1$ is located directly beneath the SDR unit 12. If the difference is smaller than a defined threshold value, then it can continue to be assumed that the CID $14_2$ is still located inside the vehicle. If however one of the receivers delivers a very strong signal in comparison with the others, then it can be assumed that the CID 143 is located outside the vehicle.

One of the weak points of the previous system for a keyless entry was the existing danger that a thief sets up one or more relay stations respectively and steals the vehicle while the owner is far away. With the SDR unit 12 described here this so-called relay station problem can be eliminated in that the travel time of the signal between the SDR unit 12 and the CID 14 and back is measured. The further away the CID 14 is, the greater is the measured travel time. If the travel times of the signals and thus the distance of the CID 14 lie above a specific limit, then the CID 14 is not accepted.

The travel time measurement can for example take place via a frequency shift, e.g. similar to the usual method of operation of radar. The transceiver, for example an FMCW transceiver, of the radar unit 12 emits a HF signal, in the present exemplary embodiment a 24 GHz signal, which is modulated in a specific bandwidth. The CID 14 receives this HF signal, modifies it in a defined way, e.g. through a frequency shift corresponding to a specific fixed frequency or through modulation, amplifies this signal and sends it back. The 24 GHz transceiver of the SDR unit 12 receives this signal, demodulates it and determines the travel time in order to determine from it the distance of the CID 14. Normally this distance will amount to less than 2 or 3 m. If however one or more relay stations are used, then substantially longer times or distances respectively can result.

With sufficient resolution the distance measurement can also be used for the outside localization of the CID 14.

FIG. 3 shows a function diagram for illustrating the normal case in which the user who carries the CID 14 on his person is located in the vicinity of the motor vehicle and a direct communication between the SDR unit 12 and the CID 14 is taking place.

In FIG. 4 the case of an attempted unauthorized use by means of two relay stations is illustrated. In this case the user, who carries the CID 14 on his person, is not in the vicinity of the vehicle. The respective thief establishes the communication between the SDR unit 12 and the CID 14 via two relay stations 16, 18. In this case no direct communication between the SDR unit 12 and the CID 14 takes place. There results a correspondingly larger distance between the SDR unit 12 and the CID 14, which can be determined via the correspondingly longer travel times.

All the above named functions can thus be realized with a radar unit 12, which can for example be a 24 GHz FMCW radar unit (SDR).

What is claimed is:

1. A securing system for a motor vehicle, comprising at least one short distance radar sensor operating in a high frequency range, which simultaneously determines a relative location of an external device with respect to the motor vehicle for use in verifying an authorized user of the motor vehicle and communicates with the external device for use in operating the motor vehicle, and wherein the short distance radar sensor comprises at least one transmitter and at least two receivers, the at least one transmitter for transmitting a locating signal and wherein the external device further comprising receiving the locating signal from the short distance radar sensor and transmitting the locating signal back to the short distance radar sensor for receipt by the at least two receivers, wherein the locating signals received by each of the receivers are compared with one another for determining whether the external device is located inside or outside the motor vehicle.

2. The securing system as recited in claim 1, wherein the external device is a remote keyless entry device for unlocking and locking the motor vehicle.

3. The securing system as recited in claim 1, wherein the locating signals which originate from different transmitters are compared with one another for localizing the external device inside or outside the motor vehicle.

4. The securing system as recited in claim 1, wherein the multifunctional sensor determines the relative location of the external device by determining a travel time of the locating signals that are exchanged between the multifunctional sensor and the external device.

5. The securing system as recited in claim 1 wherein the multifunctional sensor determines the travel time of the locating signals by determining an amount of time elapsed between transmission of the locating signal from the multifunctional sensor and the receipt of the locating signal transmitted from the external device back to the multifunctional sensor.

6. The securing system as recited in claim 1, wherein the high frequency range comprises 24 GHz.

7. A securing system for a motor vehicle comprising at least one multifunctional sensor operating in a high frequency range for communicating with an external device, wherein the multifunctional sensor emits locating signals which are received by the external device, the external device re-emits the locating signals with added identifying information, and the multifunctional sensor receives the re-emitted locating signals and determines whether to perform a function based on both the added identifying information and a distance of the external device derived from a time duration between the emission of the locating signals and the reception of the re-emitted locating signals, wherein the multifunctional sensor further determines whether the external device is located inside or outside the motor vehicle by determining a difference between each of the magnitudes of each of the locating signals and comparing the difference to a predetermined threshold.

8. The securing system as recited in claim 7, wherein the multifunctional sensor determines the external device is located inside the vehicle if the difference between each of the magnitudes is less then the predetermined threshold.

9. The securing system as recited in claim 7, wherein the multifunctional sensor determines the external device is located outside the vehicle if the difference between each of the magnitudes exceeds the predetermined threshold.

* * * * *